United States Patent [19]

Bourgonje

[11] 4,360,809
[45] Nov. 23, 1982

[54] MATRIX SWITCH AND METHOD OF CONTROLLING CROSS POINT SWITCH OF A MATRIX SWITCH

[75] Inventor: Wouter Bourgonje, Eindhoven, Netherlands

[73] Assignee: U.S. Philips Corporation, New York, N.Y.

[21] Appl. No.: 227,014

[22] Filed: Jan. 19, 1981

[30] Foreign Application Priority Data

Jan. 29, 1980 [NL] Netherlands .................. 8000529

[51] Int. Cl.³ .................. H04Q 9/00; H04Q 1/52
[52] U.S. Cl. .................. 340/825.86; 340/825.91; 179/18 GF
[58] Field of Search .......... 179/18 GF; 340/825.86, 340/825.91

[56] References Cited

U.S. PATENT DOCUMENTS

| | | | |
|---|---|---|---|
| 3,055,982 | 9/1962 | Kowalik | 179/18 GF |
| 4,057,691 | 11/1967 | Goto et al. | 179/18 GF |
| 4,096,399 | 6/1978 | Davis et al. | 179/18 GF |
| 4,113,989 | 9/1978 | Schneider | 179/18 GF |
| 4,128,741 | 12/1978 | Sternbeck | 179/18 GF |

OTHER PUBLICATIONS

"Private Electronic Switching Systems", Bezdel et al., pp. 39-43, Apr. 10-12, 1978, International Conference Paper of the Institution of Electrical Engineers.

Primary Examiner—Donald J. Yusko
Attorney, Agent, or Firm—Thomas A. Briody; William J. Streeter; Laurence A. Wright

[57] ABSTRACT

The matrix switch comprises a plurality of input lines ($Y_1-Y_4$), a plurality of output lines ($Y_1-Y_4$) and a plurality of crosspoint switches for selectively connecting one or more input lines to one or more output lines. When such a matrix switch is used for telephony systems the input lines are connected to the subscriber's lines and the output lines to the outgoing lines. Each of the input lines is coupled to input lines of an additional matrix switch via an impedance (which is equal to the characteristic impedance of the subscriber's line). The additional matrix switch has a first output line, which is connected via cross-point switches to the input lines of the additional matrix switch for terminating the selected input lines of the matrix switch with the impedance. A second output lines connects a tone generator to the input lines via the crosspoint switches.

A further embodiment shows a matrix switch arranged for use with balanced lines.

5 Claims, 2 Drawing Figures

MATRIX SWITCH AND METHOD OF CONTROLLING CROSS POINT SWITCH OF A MATRIX SWITCH

The invention relates to a matrix switch comprising a plurality of input lines, a plurality of output lines and a plurality of crosspoint switches for selectively connecting one or more input lines to one or more output lines.

BACKGROUND OF THE INVENTION

Such a matrix switch is widely known and is used in, for example, telephony, computer control applications, transmission systems etc. Using a matrix switch it is possible to connect any one input line(s) to any one output line(s). The input lines are thought of as forming the rows of the matrix, with the output lines forming the columns. The switches are located at the intersections of the rows and columns.

When such a matrix switch is used for telephony systems the input lines may be connected to the subscriber's lines and the output lines to the outgoing lines. It will be a requirement in such future telephone exchanges to terminate the subscriber's lines during open loop, tone and tone interval periods with the characteristic impedance of the line because of echo-return and cross-talk requirements. In order to satisfy these requirements it is proposed in U.S. Pat. No. 3,713,105 to replace the on/off crosspoint switches by change-over switches, which in a first position of a switch connect an input line to an output line and in a second position connect the input line to a terminating impedance. Such a matrix switch has the disadvantage that the commonly used matrix switch with on/off switches must be totally replaced by a matrix switch with change-over switches. A further disadvantage is that each crosspoint switch must be provided with an associated terminating impedance.

SUMMARY OF THE INVENTION

It is a object of the present invention to provide a matrix switch of the type mentioned in the preamble which does not have the above-mentioned disadvantages and which does not require the use of changeover switches as the crosspoint switches and in which it is not necessary to provide individual terminating impedances for each crosspoint switch. The invention provides a matrix switch as described in the opening paragraph characterized in that the matrix switch comprises a further matrix switch having a plurality of input lines, at least one output line and a plurality of crosspoint switches, that each input line of the further matrix switch is connected to input lines of the matrix switch via an impedance, that the output line of the further matrix switch is coupled to a point of substantially constant potential for terminating with the said impedance the input lines of the matrix switch selected by the crosspoint switches of the further matrix switch.

It should here be noted that it is known per se to extend a matrix switch by adding a further matrix switch as will be apparent from the article: "The ITT unimat PABX range" by W. Bezdel et al, published in IEEE Intern. Conf. on Private Electronic Switching Systems, 1978, pages 39-43. This relates, however, to a matrix switch for connection to tone signals.

The invention has the advantage that the original simple matrix switch is used and that by adding by a similar matrix switch the input lines can be terminated with the required impedance.

The invention further relates to a method of controlling crosspoint switches of a matrix switch, this matrix switch further comprising a plurality of input lines and a plurality of output lines, the crosspoint switches being located at the intersections of the said lines and connecting in a first position an input line to an output line and breaking this connection in a second position.

A further object of the invention is to provide a method with which in processor-controlled systems input lines can be connected in a simple way to a desired terminating impedance. The method is therefore characterized in that the matrix switch comprises a further matrix switch having a plurality of input lines, at least one input line and a plurality of crosspoint switches, in that each input line is coupled to input lines of the matrix switch via an impedance, in that the output line of the further matrix switch is coupled to a point of substantially constant potential and that selected crosspoint switches of the further matrix switch are adjusted to the first position for terminating with the said impedance the input lines of the matrix switch which were determined by the selected crosspoint switches of the further matrix switch.

In some telephony systems it may be desired to introduce tone signals into the network. A matrix switch according to the invention which is capable of introducing tone signals is characterized in that the further matrix switch comprises a tone generator which is connected between an output line of the further matrix switch and the said point of substantially constant potential for applying signals of tone frequency to the matrix switch input lines selected by the crosspoint switches of the further matrix switch.

As the matrix is extended by only two additional output lines for the purpose of terminating the lines with the characteristic impedance and the injection of signals of tone frequency, the control of the matrix will require little additional costs, particularly if the matrix switch is controlled by means of a processor.

The first embodiment comprises lines of the unbalanced type.

The invention further provides a matrix switch for switching balanced lines which is characterized in that the input and output lines of the matrix switch and of the further matrix switch are combined in pairs to form lines which can be excited in the balanced mode.

BRIEF DESCRIPTION OF THE DRAWINGS

Embodiments of the invention will now be described, by way of example, with reference to the accompanying drawings, in which.

Corresponding elements in the drawings have been given the same reference symbols.

DETAILED DESCRIPTION OF THE PREFERRED EMBODIMENTS

Figure 1:
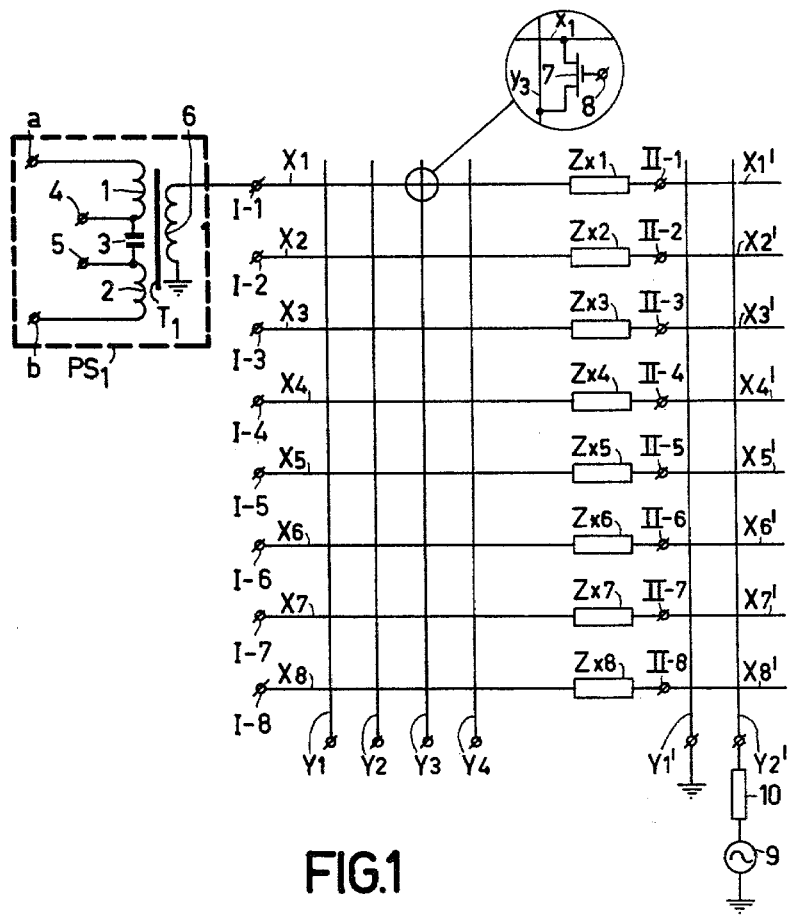
FIG. 1 shows a first embodiment of a matrix switch according to the invention.

The matrix switch shown in FIG. 1 comprises input lines $X_1, X_2, \ldots X_8$ and output lines $Y_1, Y_2, \ldots Y_4$. Although 8 input lines and 4 output lines are shown, the invention is applicable to a matrix of any other size. Signal sources can be connected to the input terminals I-1, I-2, ... I-8 of the input lines X. In the example shown in FIG. 1 known transmission bridges PS1, PS2, ... PS8 of a subscriber's circuit are used as the signal source. Only transmission bridge PS1 is shown in FIG. 1. The other transmission bridges PS2–PS8 are of the same construction. References a, b denote terminals for the connection of the subscriber's line to the primary side of a transformer T1 of transmission bridge PS1. The primary side comprises a series arrangement of a first winding 1, a capacitor 3, and a second winding 2. The direct current supply power is obtained by connecting, for example, terminal 4 of capacitor 3 to earth and by applying a voltage of −48 V to terminal 5 of capacitor 3. The secondary side of the transformer T1 consists of a winding 6, one end of which is connected to terminal I-1 of input line X1 and the other side to a point of substantially constant potential e.g. earth.

Crosspoint switches are located at the intersections or crosspoints of the input lines X1, X2, ... X8 and the output lines Y1, Y2, ... Y4. The crosspoint switches are, for example, implemented as semiconductor switches. The insert of FIG. 1 shows a semiconductor switch. A MOSFET transistor 7 is connected by means of its main current path between an input line, X1 and an output line, Y3 in this example. Input terminal 8 is connected to the gate of the transistor. The transistor is rendered conductive or non-conductive by means of a control signal applied to terminal 8, causing a connection between X1 and X3 to be effected or not effected.

It will be a requirement in some future telephone exchanges that the subscriber's line is terminated with the required line impedance during open loop, tone and tone interval periods. To achieve this the matrix switch is extended by a further matrix switch comprising a corresponding number of input lines X1', X2', ... X8' two output lines Y1' and Y2' and crosspoint switches located in the intersections of the input and the output lines. Each of the inputs II-1, II-2, ... II-8 of the further matrix switch is connected to the input lines of the first matrix switch via an impedance Zx. Thus, line X1 is connected to input II-1 via impedance Zx1, line X2 is connected to input II-2 via impedance Zx2 and so on. Output line Y1' of the further matrix switch is connected to earth. By selectively operating the crosspoint switches, which cause or do not cause a connection to be made between the input lines X1 of the further matrix switch and the output line X1' the X-lines of the matrix switch (in telephony applications the subscriber's lines) can be terminated with impedance Zx at any desired moment. In telephony applications it may be desirable to terminate the subscriber's lines with their characteristic impedance outside the periods during which the telephone set is called. This can be achieved by closing the relevant crosspoint switch of the further matrix switch outside the call period, it being a requirement that the impedance Zx approaches the characteristic impedance Zo of the subscriber's line as closely as possible. During the call period the relevant crosspoint switch is opened, as a result of which the impedance Zx no longer forms an extra load. In practice, the crosspoint switches of the matrix switch are controlled by a processor and the further matrix switch forms only a slight extension which can also be controlled by means of that processor. An advantage of this matrix switch is that the existing matrix can be maintained and that the high requirements imposed on the line termination can be satisfied with a minimum of extra equipment.

In addition to its function in terminating the line, the use of a second output line X2' renders it possible to inject tone signals into the network in a simple manner. This is achieved by connecting the output line Y2' of the further matrix switch to a tone generator 9 which has a small internal impedance 10. By switching the selective crosspoints of X'/Y' into the open or into the closed condition for a shorter or a longer period of time, varying intervals of tone-frequency signals can be generated. During the call period the relevant crosspoint switches are now opened in order to prevent them from forming an extra load. If tone injection is not required then, the further matrix need only have one output line, that is line Y1'.

Figure 2:
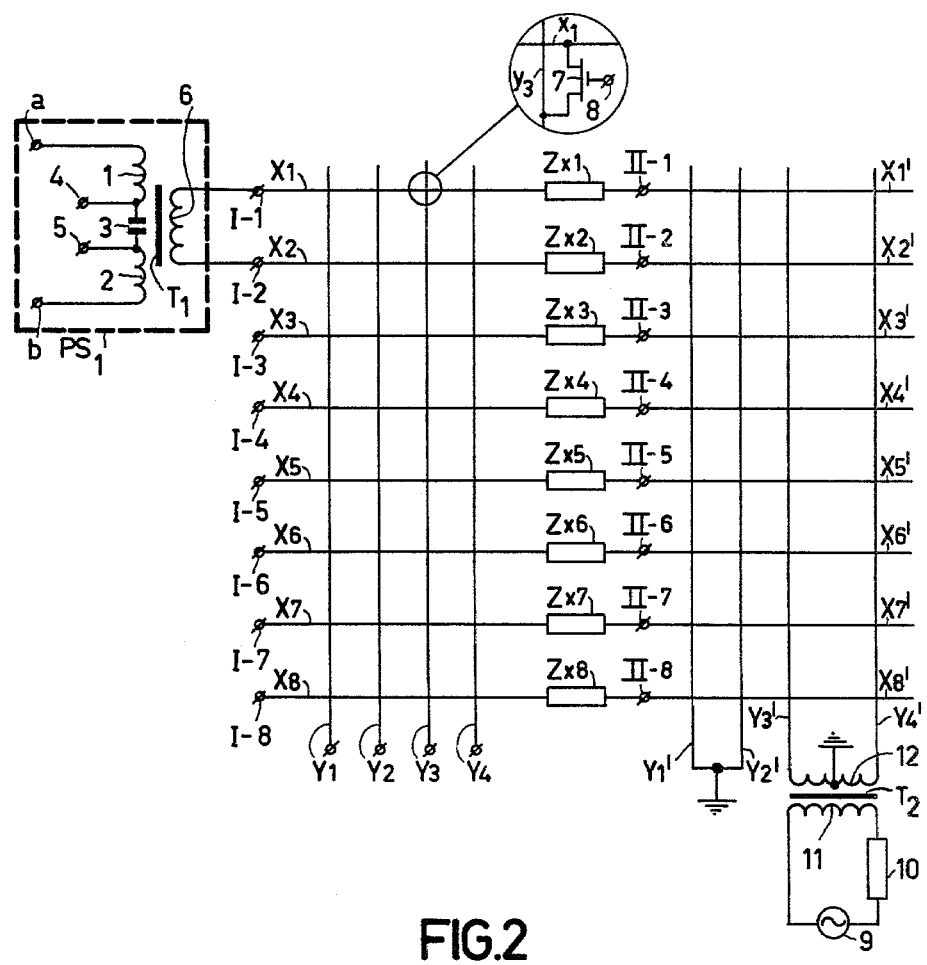
FIG. 2 shows a second embodiment of the matrix switch according to the invention which is suitable for use with unbalanced lines.

The embodiment shown in FIG. 1 is not balanced. By combining the input and output lines of the matrix switch and the further matrix switch in pairs a balanced matrix switch as soon in FIG. 2 may be obtained. The secondary winding 6 of the transformer T1 has one end connected to input terminal I-1 of input line X1 and its other end to input terminal I-2 of input line X2. The output lines Y1, Y2 form a pair at which the signal coming from the transmission bridge PS1 (in telephony applications the subscriber's signal) is available in the balanced form. The matrix switch shown in FIG. 2 in which, as in FIG. 1, 8 input lines and 4 output lines have been provided, is suitable for the connection of 4 input elements (for example transmission bridges) to 2 output elements (for example outgoing telephone lines). The input and output lines of the further matrix switch are also combined in pairs. The output lines Y1' and Y2' are interconnected and connected to earth. By allotting to each impedance Zx1 and ZX2 a value which corresponds to half the value of the characteristic impedance Zo of the subscriber's line the subscriber's line is terminated with its characteristic impedance in the balanced form. Injecting signals of the tone frequency may be carried out in the balanced mode by connecting tone generator 9 which includes the internal impedance 10 to the primary winding 11 of transformer T2. The secondary winding 12, whose centre tap is connected to earth, has one end connected to output line Y3' and the other end to output line Y4'. By controlling the crosspoint switches the line may be terminated with the required impedance and the desired signals of the tone frequency may be injected in a similar manner as described for FIG. 1.

What is claimed is:

1. A switching matrix comprising:
    a first switching matrix having a plurality of input lines, a plurality of output lines and a plurality of crosspoint switches for selectively connecting one or more input lines to one or more output lines,
    a second switching matrix having a plurality of input lines, at least one output line and a plurality of crosspoint switches, each input line of said second switching matrix being connected to the input lines of said first switching matrix by means of an impedance, the output line of said second switching matrix being coupled to a point of substantially constant potential for terminating with the said impedance the input lines of said first switching matrix selected by said crosspoint switches of said second switching matrix.

2. A switching matrix as claimed in claim 1 wherein said second switch matrix comprises a tone generator which is connected between an output line of said second switching matrix and the said point of substantially constant potential for applying tone frequency signals to said first switching matrix input lines selected by said crosspoint switches of said second switching matrix.

3. A switching matrix as claimed in claim 1 wherein said input and output lines of said first switching matrix and said second switching matrix are combined in pairs to form lines which can be excited in the balanced mode.

4. A switching matrix comprising a plurality of controlling crosspoint switches in a first switching matrix said first switching matrix further comprising a plurality of input lines and a plurality of output lines, said crosspoint switches being located at the intersections of the said lines and interconnecting in a first position an input line to an output line and breaking this connection in a second position,
   a second switching matrix having a plurality of input lines, at least one output line and a plurality of crosspoint switches, each input line of said second switching matrix being coupled to the input lines of said first switching matrix by means of an impedance, the output line of said second switching matrix being coupled to a point of substantially constant potential, selected crosspoint switches of said second switching matrix being adjusted to the first position for terminating with said impedance the input lines of said first switching matrix which were determined by the selected crosspoint switches of said second switching matrix.

5. The switching matrix as claimed in claim 4 wherein said second switching matrix comprises a tone generator which is connected to an output line of said second switching matrix, selected crosspoint switches of the said output line of said second switching matrix being adjusted to the first position during a predetermined period of time and with a predetermined repetition frequency.

* * * * *